Figure 1:
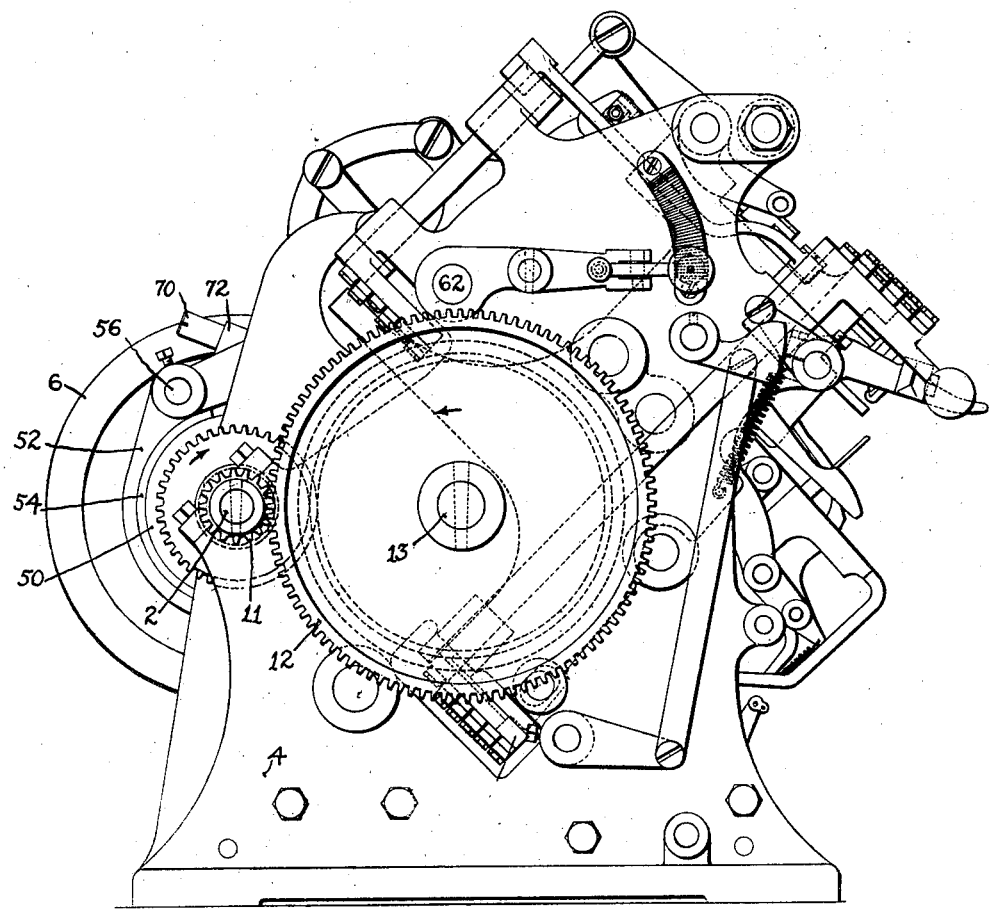

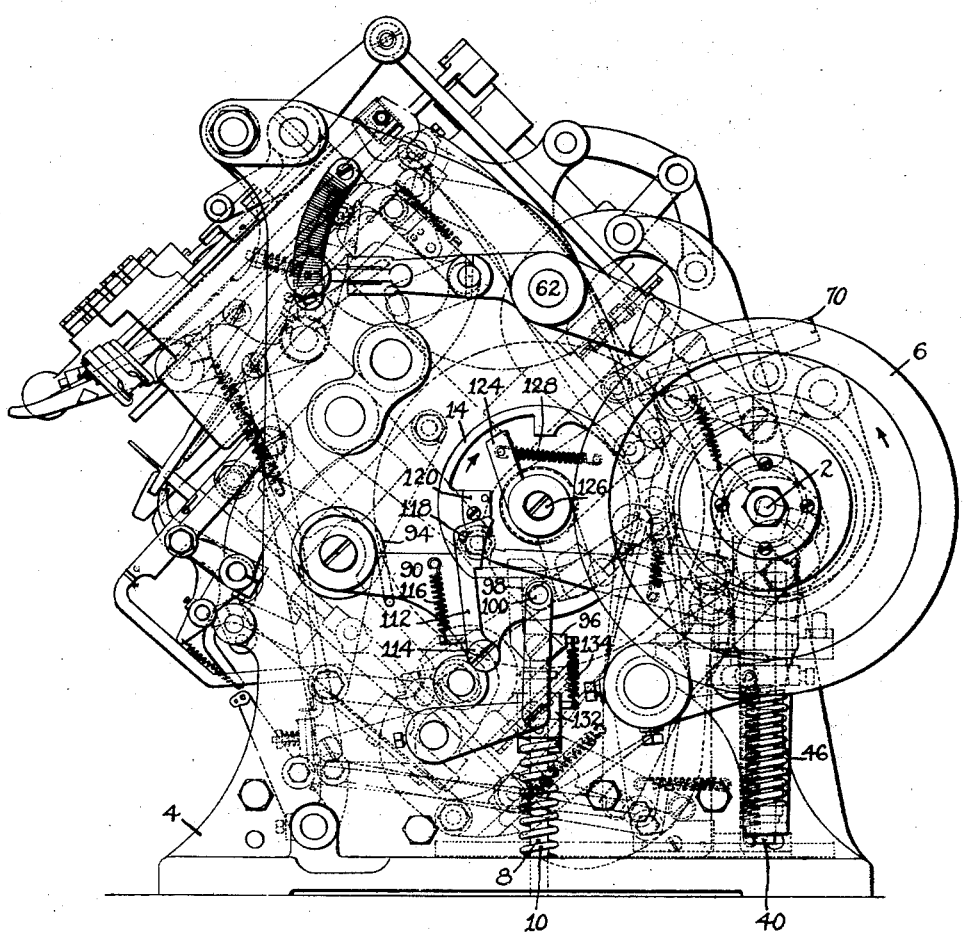

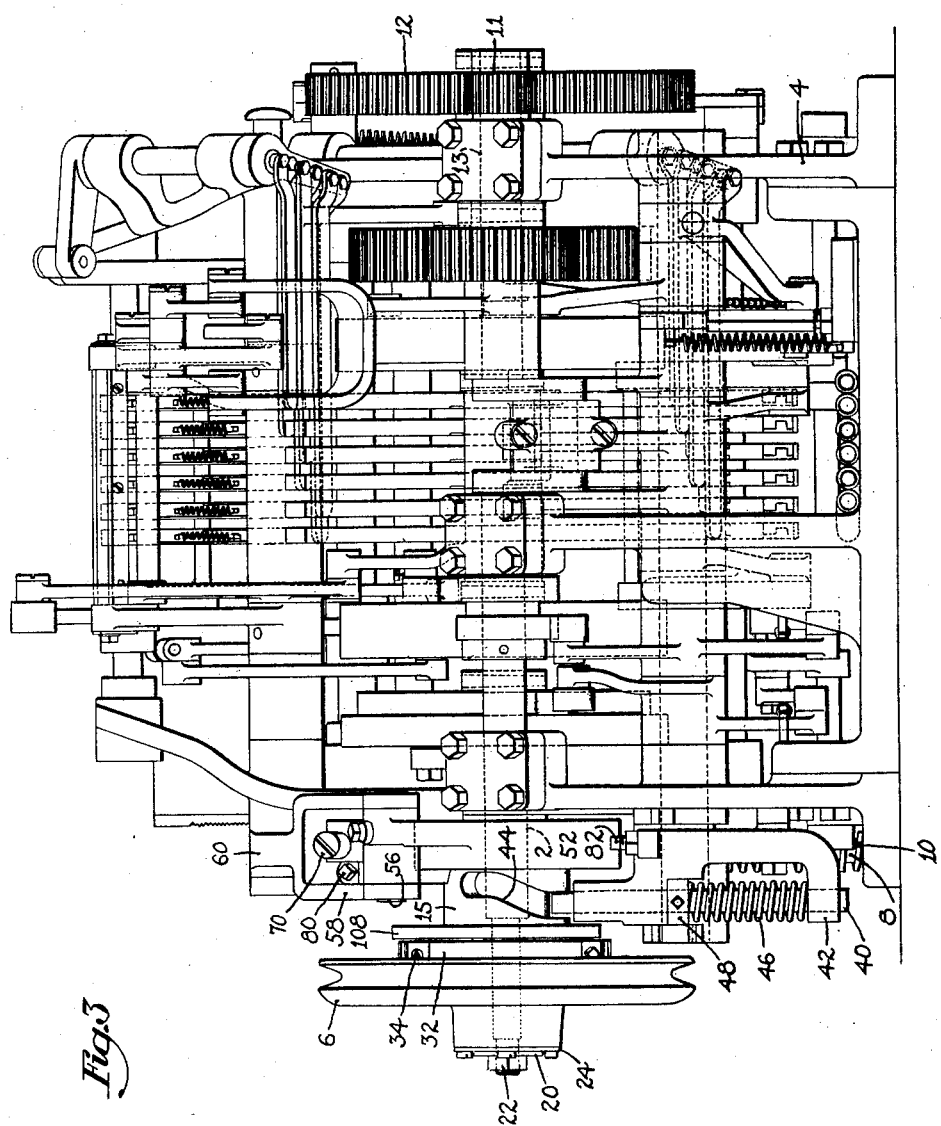

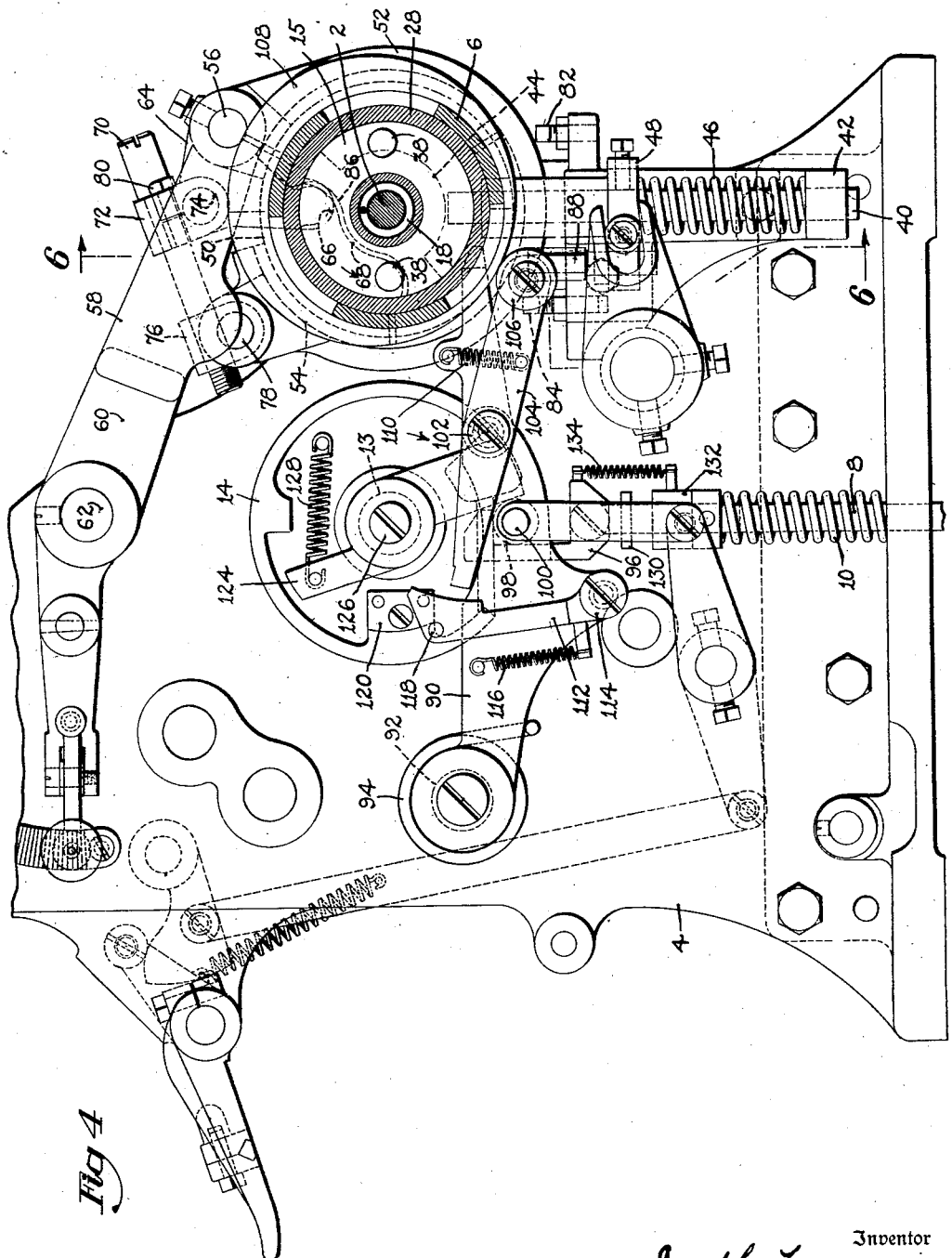

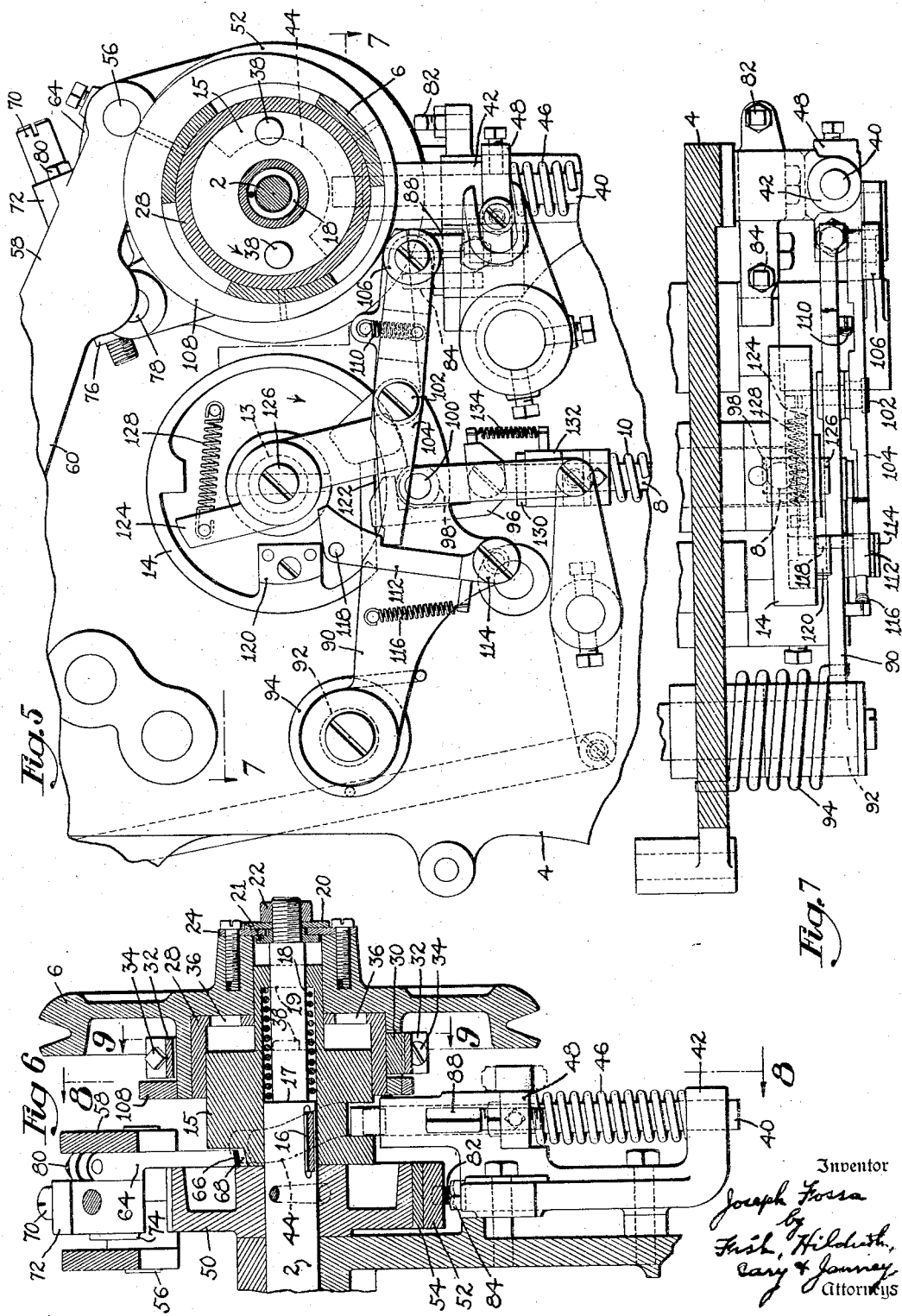

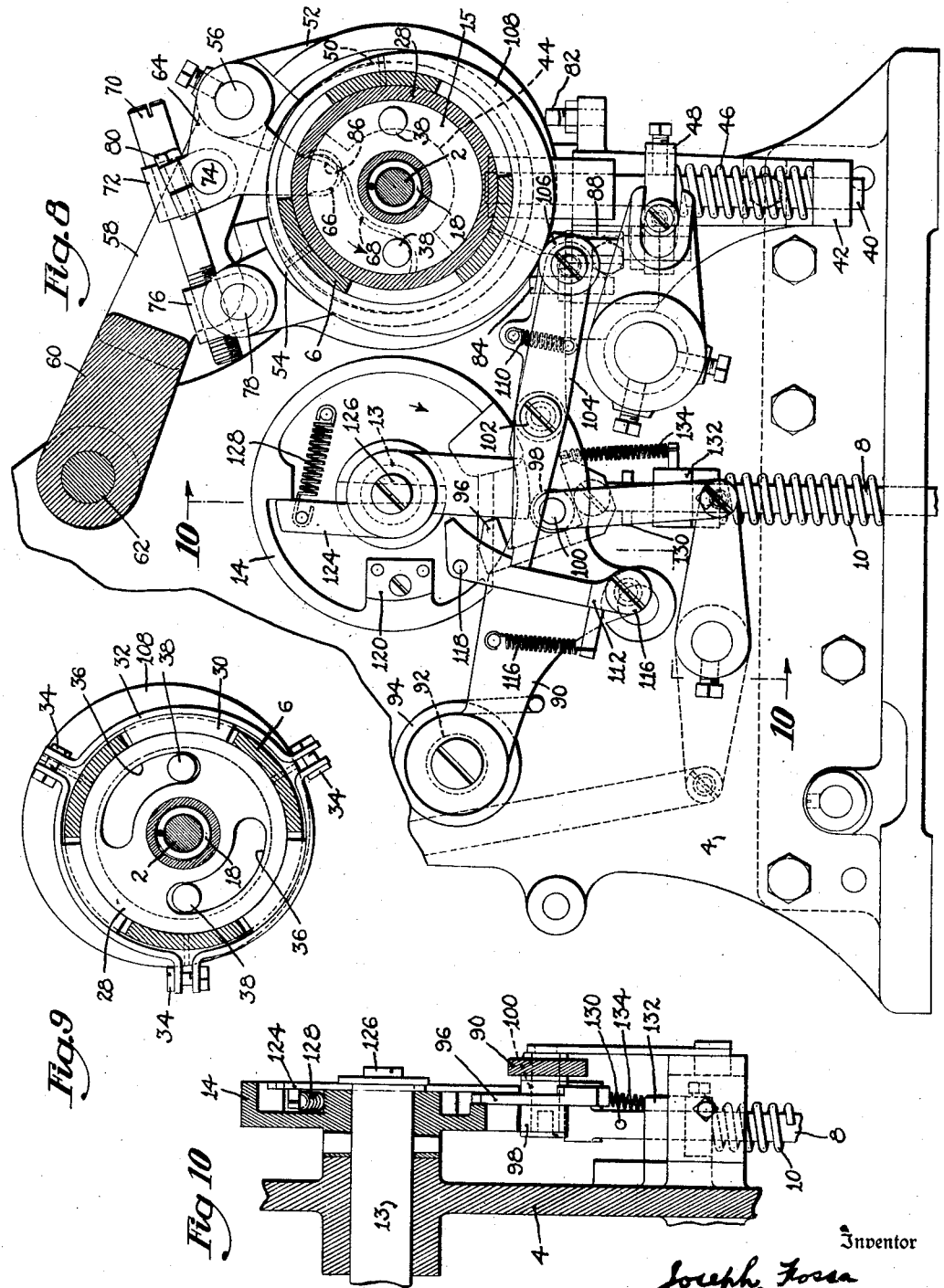

Patented Aug. 8, 1939

2,169,094

UNITED STATES PATENT OFFICE 2,169,094

DRIVING AND STOPPING MECHANISM

Joseph Fossa, Salem, Mass., assignor to United Shoe Machinery Corporation, Paterson, N. J., a corporation of New Jersey Original application May 11, 1935, Serial No. 21,011. Divided and this application July 20, 1937, Serial No. 154,603

11 Claims. (Cl. 192—148)

The present invention relates to driving and stopping mechanisms, and is herein disclosed as applied to the shoe upper lacing machine described in the inventor's pending application Serial No. 21,011, filed May 11, 1935, of which application the present application is a division. While not necessarily limited to use in any particular type of machine, a driving and stopping mechanism embodying the invention is particularly adapted for use in a machine comprising several operating or cam shafts running at different speeds.

Generally stated, the object of the present invention is to provide a novel and improved driving and stopping mechanism, particularly applicable for use in machines which, when set in operation, are out of control of the operator and which are automatically brought to rest when the operation which the machine is designed to perform is completed. More specifically the objects of the invention are to provide a driving and stopping mechanism in which the main driving clutch can be thrown into operation fully, with certainty and with slight exertion on the part of the operator, and to provide a driving and stopping mechanism by which the machine will be surely maintained in operation and out of control of the operator until its operations are fully completed and will then be stopped with the machine parts in the required position to permit the machine to be again put into operation.

With the above objects in view, a driving and stopping mechanism embodying the present invention will comprise a suitable clutch for connecting and disconnecting a driving member and shaft, a clutch control member, the movement of which causes the clutch to connect and disconnect the driving member and shaft, and a single revolution stop cam driven by the shaft and engaging the lever.

In accordance with one feature of the present invention a treadle controlled power mechanism is combined with these parts for actuating the clutch control member, whereby the clutch can be operated with certainty and with slight exertion on the part of the operator.

In the mechanism hereinafter specifically described, an initial movement is imparted to the clutch control member from a foot treadle and, in accordance with a further feature of the present invention, a movable member is provided on the stop cam which is released by the movement of the clutch control member under the action of the treadle, and acts to prevent an immediate return movement of the clutch control member, whereby the starting of the machine is insured, even if the treadle is released immediately upon being depressed.

In accordance with another feature of the invention, means actuated by the stop cam are provided for rendering inoperative the connections through which the control member is actuated by the treadle, whereby a repeated operation of the machine is prevented even if the treadle is depressed continuously.

Other features of the present invention consist in the novel mechanical devices, combinations and arrangements of parts hereinafter described and claimed.

The several features of the present invention, and the advantages to be obtained thereby will be readily understood by one skilled in the art from the following description, taken in connection with the accompanying drawings in which Figure 1 is a view in left side elevation of a shoe upper lacing machine embodying the driving and stopping mechanism of the present invention; Figure 2 is a view in side elevation looking from the right of the machine; Figure 3 is a view in rear elevation of the machine shown in Figure 1; Figure 4 is a view in elevation looking from the right, partly in section and partly broken away, showing certain parts of the driving and stopping mechanisms in stopping positions; Figure 5 is a similar view with the same parts in starting positions; Figure 6 is a sectional view taken along the line 6—6 of Figure 4; Figure 7 is a sectional view, taken along the line 7—7 of Figure 5; Figure 8 is another sectional view taken along the line 8—8 of Figure 6, illustrating positions assumed by the parts subsequently to those shown in Figure 5; Figure 9 is a detail view of the clutch taken in section on line 9—9 of Figure 6; and Figure 10 is a sectional view taken along the line 10—10 of Figure 8.

The machine illustrated in the drawings is a shoe upper lacing machine and is provided with a row of parallel eye pointed needles on which, while stationary, oppositely disposed aligned eyelets in the quarter portions of a folded upper are impaled by the operator. When the machine is started, the upper is gripped in its folded condition and held in the machine until the lacing is completed. Thereafter, the upper drops from the machine and the machine is brought to rest.

The moving parts of the machine are actuated while the machine is in operation through trains of mechanisms driven from a number of shafts which rotate at different speeds and which comprise a main shaft 2 which makes six complete revolutions during the operation on a shoe upper, and a shaft 13 which makes a single revolution during the operation on the upper.

The driving and stopping mechanism of the machine comprises a main driving pulley 6 for driving the shaft 2 and a clutch, hereinafter described, by which the driving pulley is connected to and disconnected from the shaft. The pulley 6 is caused to be connected with the shaft by the depression of a treadle connected rod 8. A spring 10 coiled about the rod causes it to rise when the treadle is released. After the pulley is connected to the shaft 2, it is held in engagement therewith out of the control of the operator until the shaft has made six complete revolutions and is then automatically disconnected from the shaft to bring the machine to rest with its actuating parts in the desired position. The means for accomplishing this result comprise a stop cam 14 secured to the right end of the single revolution shaft 13 which is driven from the shaft 2 through a pinion 11 on the shaft 2, and a gear 12 on the shaft 13.

The main driving pulley 6 is loosely supported at the end of the main driving shaft 2 in part by a sleeve 15 (Fig. 6) mounted to slide on the shaft and connected with the shaft by a key 16. The shaft is of reduced diameter towards its outer end, providing a shoulder 17 against which one end of a compression spring 18 rests. The other end of the spring 18 engages an internal shoulder 19 formed within the sleeve 15 between a portion of the central passage therein which slidably fits the main shaft 2 and another portion of the central passage which fits the reduced end of the shaft. Compression spring 18 thus tends to force the sleeve outwardly on the shaft. The driving pulley 6 is rotatable on a reduced portion of the sleeve 15 and is held in position longitudinally of the shaft by a collared bushing 21 and a washer 20 secured against a shoulder formed at the end of the shaft by a still further reduced and threaded portion of the shaft carrying a nut 22. Between the bushing and the washer is loosely mounted a collar 24 secured to the hub of the driving pulley 6 by screws 26.

The clutch for connecting the driving pulley 6 to the shaft 2 comprises a cup-shaped bushing 28 within a suitable recess in the driving pulley 6 frictionally connected to the pulley by means of friction members 30 (see Fig. 9) riveted to a clamp ring 32 made in three sections and connected by suitable adjusting screws 34. The outer end of the bushing 28 is provided with arcuate slots 36 into which the ends of pins 38 on the sleeve 15 enter when the sleeve is moved along the shaft towards the end by the spring 18.

To connect or disconnect the sleeve 15 and the bushing 28, a vertical controlling rod 40 is provided to slide in a bracket 42 secured to the machine frame. This rod, when raised, cooperates with a cam slot 44 in the sleeve 15 to move the sleeve inwardly to bring the machine to rest. The rod is raised towards the sleeve by a spring 46 on the rod, compressed between the lower portion of the bracket 42 and a block 48 fixed to the rod. When the rod is withdrawn from the sleeve 15, the spring 18 causes the sleeve to move outwardly along the shaft and the pins 38 to enter the arcuate slots 36, establishing a driving connection between the shaft 2 and the driving pulley 6. However, the friction members 30 are so adjusted that slippage may take place between the bushing 28 and the pulley 6 as the driving shaft 2 is being brought up to speed, but sufficient friction is obtained to prevent slippage after the machine is brought up to speed. With such an adjustment, the slippage in the frictional connection will gradually decrease to zero as the shaft speed increases and reaches zero slippage when the shaft is driven at the speed of the pulley. Such a connection is not only advantageous in starting the machine, but is also advantageous when the machine, through improper adjustment or other cause, is given an excessive load, the connection permitting the drive shaft to stop without causing injury to the parts of the machine.

To bring the machine to rest with the shaft 2 at a definite angular position, there is secured to the shaft a brake drum 50 and surrounding the brake drum is a band 52 having frictional material 54 secured to its inner face. One end of the brake band is pivotally mounted on a pin 56 (Fig. 8) passing through the bifurcated end 58 of a lever 60. The lever 60 is loosely mounted on the right end of a shaft 62 in the frame of the machine. Also loosely mounted on the pin 56 is a lever 64 having a cam face 66 (Fig. 6) arranged to cooperate with a cam surface 68 formed at the inner end of the sleeve 15. The cam lever 64 is connected to the other end of the brake band 52 by connections comprising an adjusting screw 70 passing loosely through a swivel block 72 clamped to a pin 74 passing through the lever 64. The screw 70 is threaded into a block 76 rotatable about a pivot 78 in said other end of the brake band. The pin 74 is held in the lever 64 by a clamping bolt 80.

The diameter of the brake band is determined by adjusting the screw 70, and in order to maintain the band in concentric relation with the brake drum, two adjustable stop screws 82 and 84 are provided, on which two separate portions of the brake band rest. These stop screws and the pivotal mounting of the band on the lever 60, and the pivotal mounting of this lever itself, permit the brake band to float freely without normally touching the brake drum 50

When it is desired to stop the machine, the control rod 40 is permitted to be lifted automatically by the spring 46 and the end of this rod engages the outer surface of the sleeve 15 until the cam slot 44 reaches such a position that the upper end of the rod will enter the slot. The shape of the cam slot is such that, upon continued rotation, the sleeve 15 is brought inwardly (to the left in Fig. 6) to disconnect the pins 38 from the slots 36, thus stopping the drive of the shaft from the pulley 6. As this disconnection takes place, the cam surface 68 on the sleeve 15 has become positioned beneath the cam lever 64 so that the cam face 66 thereon starts to ride upon the cam surface 68. The cam face 66 is lifted by a gradual rise on the cam surface 68 which causes the cam lever 64 to pull on the adjusting screw 70, through the pin 74 and swivel block 72. The screw 70 pulls on the block 76 and pivot 78, to contract the brake band so that its friction material 54 engages the brake drum 50 with increasing force, to slow down the rotation of the shaft. The end of the cam surface 68 is steep to form an abutment 86 (Fig. 8) which, when it strikes the side portion of the cam face 66, stops the machine in a definite angular position. As the speed has been reduced gradually by the increasing force with which the brake band has been contracted, this final stopping at a definite angular position is without substantial shock.

When the machine is started again, by the withdrawal of the controlling rod 40 from the cam slot 44, the spring 18 in sliding sleeve 15 to the right not only causes the pins 38 to engage the slots 36, but it also causes the cam surface 68 on the sleeve to withdraw from beneath the cam lever 64, releasing the brake, which then expands, due to the elasticity of the brake band 52 to clear the brake drum.

To draw the controlling rod 40 downwardly from the cam slot 44 in starting the machine, there are provided normally inoperative mechanism driven by the driving pulley 6 and connections operated by the treadle rod 8 for rendering the connections operative. The block 48 on the rod carries a vertically arranged adjusting set screw 88 threaded into the block with a hexagonal head extending upwardly. Forwardly and above the adjusting screw 88 is an arm 90 pivotally mounted on a stud 92 on the side frame of the machine, so arranged that when the end of the arm is forced downwardly it abuts the screw and causes the rod 40 to be depressed. The arm is held in raised position away from the head of the screw 40 while the machine is at rest by a spring 94 coiled about the hub of the arm with one end engaging the underside of the arm and the other end, an opening in the machine frame.

The treadle rod 8 is so arranged that when depressed it will cause the arm 90 to be moved downwardly until it engages, without actually moving, the screw 88. Thereafter further downward movement of the arm 90 against the screw is caused automatically by the connections actuated by the driving pulley 6. To cause downward movement of the arm 90 when the treadle is depressed, the upper end of the treadle rod 8 is pivotally connected to a hook member 96 arranged to engage a roll 98 rotatable on a pivot 100 on the central part of the arm 90. To cause further downward movement of the arm 90, the arm carries a stud screw 102 on which is a lever 104 having a cam roll 106 engaging a circular eccentric cam 108 secured to the driving pulley 6. While the driving pulley is being rotated the lever 104 is oscillated continuously thereby. To hold the cam roll 106 in engagement with the cam 108, a tension spring 110 is stretched between a pin on the arm 90 and a pin on the lever 104. When the arm 90 is moved downwardly, the roll 106 on the lever 104 being held against the cam 108 acts as a fulcrum point for the lever 104 and the forward arm of the lever 104 is moved downwardly relatively to the arm 90. When moved downwardly the forward end of the lever 104 is held by a latch member 112 pivotally mounted at its lower end on a screw 114 secured in the arm 90 and yieldingly held in engagement with the lever 104 during operation of the machine by a spring 116 connected between the arm 90 and the latch member. The lever 104 is not latched until the forward arm of the lever is lowered against the screw 88 by the treadle. After the lever 104 is latched, the lever and the arm 90 act as a unit as the cam 108 rotates to withdraw the controlling rod 40 from the cam slot 44 and start the machine in operation. When the machine is again brought to rest, the driving pulley 6 and cam 108 only are rotated, and the lever 104 is oscillated idly by the cam 108, the latch member 112 held out of engagement with the lever 104, as shown in Figure 4.

To hold the latch member 112 out of engagement with the lever 104 when the machine is at rest, a pin 118 is provided in the upper end of the latch member in a position to be engaged by a cam block 120 secured to the right side of the circular stop cam 14, the stop cam 14 being rotated once for each complete operation of the machine. The latch member 112 is permitted to move into engagement with the lever 104 to start the machine when the arm 90 carrying the latch is lowered by depressing the treadle rod 8, moving the pin 18 away from the block 120.

After the treadle rod 8 is depressed, the pin 118 moves rearwardly beneath the lower end of the cam block 120 of the cam 14 into the position shown in Figure 5, where an upper arcuate portion of the latch may first engage the lever 104, and as the end of the lever moves downwardly, it passes beneath the shoulder on the latch. Thereafter, as the cam 108 rotates, the lever 104 being latched rigidly with the arm 90, the arm is moved still further downwardly, withdrawing the controlling rod 40 from the cam slot 44. The shaft 2 is then connected to the driving pulley 6 and the machine is started. The arm 90 is then held down for one revolution by the concentric outer surface of the cam 14 engaging the roll 98 on the arm 90 during six rotations of the main shaft 2.

After the machine has completed its operations, the roll 98 enters a recess 122 in the cam 14 and the controlling rod 40 is allowed to engage the cam slot 44 and stop the machine.

To prevent the arm 90 from being raised immediately after starting the machine, there is loosely mounted at the end of the shaft 13 a lever 124 held on the end of the shaft by a washer and screw 126 threaded into the end of the shaft. As soon as the arm 90 is depressed by the action of the cam 108 and lever 104, the lower arcuate end of the lever 124 slides over the roll 98 under the action of a spring 128 stretched between the upper end of the lever 124 and a pin on the cam 14. The arrangement of cam 14 is such that it will depress arm 90 slightly lower than the position to which it was moved by the oscillating lever 104 so that the lever will be held away from the latch shoulder. Since the driving pulley 6 makes six revolutions during one complete operation of the machine, the lever 104 will be oscillated idly below the shoulder of the latch member 112 six times during a lacing operation, the arm 90 remaining in its lowest position.

Further downward movement of the treadle rod 8 after the free end of the arm 90 contacts the head of the set screw 88 is prevented by a pin 130 passing through the rod 8 and arranged to engage the upper surface of a boss 132 which slidably supports the rod on the machine frame.

To prevent continued operation of the machine in case the treadle rod is held in depressed position during and after completion of the machine operation, the hook member 96 which is pivotally mounted at the upper end of the treadle rod is arranged to swing forwardly of the machine out of engagement with the roll 98. The hook member is held yieldingly in engagement with the roll by a spring 134 connected between pins on the boss 132 and on the hook member respectively. As the arm 90 is depressed and the machine started, the hook member 96 is acted upon by the lever 124 to disconnect it from the roll. As the roll 98 enters the recess 122 of the cam 14 at the end of the operation, it is engaged by the advancing edge or shoulder of the lever 124 and the lever is held against rotation by the roll until the machine is again started. At the same time that the roll 98 enters the recess 122 of the cam, the block 120 acts against the pin 118 to withdraw the latch member from engagement with the lever 104 and prevent another operation of the machine.

The nature and scope of the invention having been indicated, and a construction embodying a particular feature of the invention having been specifically described, what is claimed is:

1. A driving and stopping mechanism having, in combination, a shaft, a driving member therefor, a clutch to connect and disconnect the driving member and shaft, a movable clutch control member, connections between the control member and clutch for causing the clutch to connect and disconnect the driving member and shaft, a single revolution stop cam in addition to said connections between the control member and the clutch driven by the shaft and engaged by the clutch control member, said cam acting at the completion of its rotation to actuate the clutch control member to cause the clutch to disconnect the driving member and shaft normally inoperative mechanism driven by the driving member for actuating the clutch controlling member to cause the clutch to connect the driving member and shaft, and treadle operated connections for rendering said mechanism operative.

2. A driving and stopping mechanism having, in combination, a multiple revolution shaft, a driving member therefor, a clutch to connect and disconnect the driving member and shaft, a single revolution stop cam driven by the shaft, a movable clutch control member engaged by the cam, connections exclusive of the stop cam between the control member and the clutch for causing the clutch to connect and disconnect the driving member and multiple revolution shaft, said cam acting at the completion of its rotation to actuate the clutch control member to cause the clutch to disconnect the driving member and shaft, normally inoperative mechanism driven by the driving member for actuating the clutch controlling member to cause the clutch to connect the driving member and multiple revolution shaft, and treadle operated connections for rendering said mechanism operative.

3. A driving and stopping mechanism having, in combination, a shaft, a driving member therefor, a clutch to connect and disconnect the driving member and shaft, a movable clutch control member, connections between the control member and clutch for causing the clutch to connect and disconnect the driving member and shaft, a single revolution stop cam in addition to said connections between the control member and the clutch driven by the shaft and engaged by the clutch control member, said cam acting at the completion of its rotation to actuate the clutch control member to cause the clutch to disconnect the driving member and shaft, a cam on the driving member, mechanism driven by the cam for actuating the clutch controlling member to cause the clutch to connect the driving member and shaft, and treadle operated connections for rendering said mechanism operative.

4. A driving and stopping mechanism having, in combination, a shaft, a driving member therefor, a clutch to connect and disconnect the driving member and shaft, a movable clutch control member, connections between the control member and clutch for causing the clutch to connect and disconnect the driving member and shaft, a single revolution stop cam in addition to said connections between the control member and the clutch driven by the shaft and engaged by the clutch control member, said cam acting at the completion of its rotation to actuate the clutch control member to cause the clutch to disconnect the driving member and shaft a cam on the driving member, a member actuated by the cam on the driving member, a latch to connect the cam actuated member and the clutch control member to cause the clutch to connect the driving member and shaft, and treadle operated connections for causing the latch to connect said members.

5. A driving and stopping mechanism having, in combination, a shaft, a driving member therefor, a clutch to connect and disconnect the driving member and shaft, a movable clutch control member, connections between the control member and clutch for causing the clutch to connect and disconnect the driving member and shaft, a single revolution stop cam in addition to said connections between the control member and the clutch driven by the shaft and engaged by the clutch control member said cam acting at the completion of its rotation to actuate the clutch control member to cause the clutch to disconnect the driving member and shaft a cam on the driving member, a member actuated by the cam on the driving member, a latch mounted on the control member, means for holding the latch in inoperative position, and treadle operated connections for causing the latch to connect the control member and the cam actuated member to cause the clutch to connect the driving member and shaft.

6. A driving and stopping mechanism having, in combination, a shaft, a driving member therefor, a clutch to connect and disconnect the driving member and shaft, a movable clutch control member, connections between the control member and clutch for causing the clutch to connect and disconnect the driving member and shaft, a single revolution stop cam in addition to said connections between the control member and the clutch driven by the shaft and engaged by the clutch control member, said cam acting at the completion of its rotation to actuate the clutch control member to cause the clutch to disconnect the driving member and shaft a cam on the driving member, a member actuated by the cam on the driving member, a latch to connect the cam actuated member and the clutch control member to cause the clutch to connect the driving member and shaft, treadle operated connections for causing the latch to connect said members, and a cam driven by the shaft for moving the latch to inoperative position.

7. A driving and stopping mechanism having, in combination, a shaft, a driving member therefor, a clutch to connect and disconnect the driving member and shaft, a movable clutch control member, connections between the control member and clutch for causing the clutch to connect and disconnect the driving member and shaft, a single revolution stop cam in addition to said connections between the control member and the clutch driven by the shaft and engaged by the clutch control member, said cam acting at the completion of its rotation to actuate the clutch control member to cause the clutch to disconnect the driving member and shaft means for moving the clutch control member to cause the clutch to connect the driving member and shaft, and a member released by the movement of the control member yieldingly mounted for limited rotation with relation to the stop cam and movable, when released, to a position in which return movement of the control member is prevented.

8. A driving and stopping mechanism having, in combination, a shaft, a driving member therefor, a clutch to connect and disconnect the driving member and shaft, a movable clutch control member, connections between the control member and clutch for causing the clutch to connect and disconnect the driving member and shaft, a single revolution stop cam in addition to said connections between the control member and the clutch driven by the shaft and engaged by the clutch control member, said cam acting at the completion of its rotation to actuate the clutch control member to cause the clutch to disconnect the driving member and shaft and means including treadle operated connections for moving the clutch control member to cause the clutch to connect the driving member and shaft, said connections including means actuated by the stop cam for rendering said connections inoperative to prevent return movement of the control member.

9. A driving and stopping mechanism having, in combination, a shaft, a driving member therefor, a clutch to connect and disconnect the driving member and shaft, a movable clutch control member, connections between the control member and clutch for causing the clutch to connect and disconnect the driving member and shaft, a single revolution stop cam driven by the shaft and engaged by the clutch control member, a cam on the driving member, a cam actuated lever mounted on the control member, a latch mounted on the control member movable, when released, to connect the control member and the cam actuated lever to cause the clutch to connect the driving member and shaft, an abutment on the stop cam to hold the latch in inoperative position, and treadle operated connections for moving the control member to release the latch.

10. A driving and stopping mechanism having, in combination, a shaft, a driving member therefor, a clutch to connect and disconnect the driving member and shaft, a movable clutch control member, connections between the control member and clutch for causing the clutch to connect and disconnect the driving member and shaft, a single revolution stop cam driven by the shaft and engaged by the clutch control member, means including treadle operated connections for moving the clutch control member to cause the clutch to connect the driving member and shaft, said connections including means actuated by the stop cam for rendering said connections inoperative to prevent return movement of the control member, and a member released by the movement of the control member yieldingly mounted for limited rotation with relation to the stop cam and movable, when released, to a position in which return movement of the control member is prevented.

11. A driving and stopping mechanism having, in combination, a shaft, a driving member therefor, a clutch to connect and disconnect the driving member and shaft, a movable clutch control member, connections between the control member and clutch for causing the clutch to connect and disconnect the driving member and shaft, a single revolution stop cam driven by the shaft and engaged by the clutch control member, a cam on the driving member, a lever actuated by the cam mounted on the control member, a latch on the control member movable, when released, to connect the control member and cam actuated lever to cause the clutch to connect the driving member and shaft, an abutment on the stop cam to hold the latch in inoperative position, means including treadle operated connections for moving the clutch control member to release the latch, said connections including means actuated by the stop cam for rendering said connections inoperative to prevent return movement of the control member, and a member released by the movement of the control member yieldingly mounted for limited rotation with relation to the stop cam and movable, when released, to a position in which return movement of the control member is prevented.

JOSEPH FOSSA.